United States Patent [19]

Tewksbury

[11] 3,866,230

[45] Feb. 11, 1975

[54] SINGLE CHANNEL COMMUNICATION SYSTEM

[75] Inventor: John M. Tewksbury, Baltimore, Md.

[73] Assignee: The Bendix Corporation, Southfield, Mich.

[22] Filed: Mar. 2, 1973

[21] Appl. No.: 337,520

[52] U.S. Cl. ................. 343/178, 178/58 R, 178/68, 178/69.5 R, 325/17, 340/147 SY, 343/179

[51] Int. Cl. ............................................ H04b 1/40

[58] Field of Search ............... 178/68, 69.5 R, 58 R; 179/15 BS; 325/15–17, 58; 343/175, 178, 179; 340/147 SY

[56] References Cited

UNITED STATES PATENTS

| | | | |
|---|---|---|---|
| 2,540,876 | 2/1951 | Hansell | 343/179 |
| 3,618,025 | 11/1971 | Tomozawa | 343/175 |
| 3,688,036 | 8/1972 | Bland | 340/147 SY |

*Primary Examiner*—Robert L. Griffin
*Assistant Examiner*—Marc E. Bookbinder
*Attorney, Agent, or Firm*—W. G. Christoforo; Bruce L. Lamb

[57] ABSTRACT

In a single channel communication system which includes cooperating stations, each station transmits a train of pulses, each cycle of these pulses transmitted from a local station being modified by pulses received from another cooperating station to reduce or increase the local pulse period as needed to produce identical periods at each station and also to transmit pulses from the local station during the time between received pulses. An equilibrium condition is established in which the departure from synchronization of transmitted and received pulses in each station is proportional to its need for control. Intelligent modulation of the pulse period at any station is then evident and may be recovered at each station.

3 Claims, 4 Drawing Figures

SINGLE CHANNEL COMMUNICATION SYSTEM

REFERENCE TO RELATED APPLICATIONS

The present invention is an improvement over the inventions described in the copending patent applications, "A single Channel Duplex Space Length Pulse Communication System," Ser. No. 196,827, filed Nov. 8, 1971, now U.S. Pat. No. 3,750,179 which is a continuation of an application Ser. No. 873,869, now abandoned filed Nov. 4, 1969, and "Communication System with Same Frequency Repeater Station Capability," Ser. No. 228,532, filed Feb. 23, 1972, now U.S. Pat. No. 3,753,112 both these latter inventions being invented by John M. Tewksbury and assigned to the same assignee as in the present application. Both of these latter applications are herein incorporated by reference.

BACKGROUND OF THE INVENTION

This invention relates to communication systems and more particularly to communication systems which include a plurality of stations wherein each cooperating station can simultaneously transmit and receive with other cooperating stations and on the same channel. A communication system of this type and the stations suitable for use therein were described in the first of the above mentioned patent applications. Briefly, in that patent application there is described a system wherein each of the continuously operating transmitters in the cooperating stations is controlled by a local oscillator. Each cycle of the local oscillator is modified by pulses received from other cooperating stations, to reduce or increase the period as needed to produce identical periods in all oscillators and additionally to produce substantial coincidence at each local station of the transmitted and received pulses. Since the pulses from other stations received at a local station are not perceptible during the local transmission, and no control is then exerted, as equilibrium condition is immediately established in which the departure from coincidence of transmitted and received pulses at each station is proportional to its need for control. Intelligent modulation of the pulse period at any station is then evident and can be recovered at all stations. In essence, each station not only seeks to synchronize its local pulses with received pulses but also seeks to make local pulses coincide with the received pulses. Thus, intelligence is recovered from the received pulses by considering those portions of the received pulses which do not exactly coincide with the local pulses. Since the local pulses are also transmitted it is necessary that the receiver at each local station have the ability to recover rapidly after transmission so that subsequently received pulses can be considered. It is also desirable that the locally transmitted pulses terminate rapidly so as to assist rapid receiver recovery, thereby making it preferable that rectangular pulses be used. This type of system generally requires a bandwidth in excess of that required for narrow band AM or FM systems. In the second of the above mentioned patent applications a single channel communication system similar to that in the first patent application is described and there is also described how the system can operate with stations having push-to-talk switches, wherein the receivers in cooperating stations remain energized to synchronize their locally generated pulses with received pulses so that received intelligence is recovered but wherein these locally produced pulses are not transmitted until a push-to-talk means is energized. As in the first mentioned patent application, each local station seeks to produce local pulses which are substantially coincident with received pulses.

SUMMARY OF THE INVENTION

The required bandwidth of the communication system of the type described above can be reduced through the use of a shaped pulse, such as a cosine shaped RF envelope. However, where the locally generated pulses are sought to be made coincident with received pulses such a shaped pulse would be difficult to utilize since the transmitted pulse from a given station is on a level which is very large in comparison with the received signal. This renders reception difficult or impossible except at the extreme edges of the pulse envelope where, if substantial coincidence has been attained, the received pulse is very low.

The present invention overcomes these two problems by transmitting its local pulses generally midway between the received pulses so that the local receiver will have fully recovered sensitivity at the time pulses from a cooperating station are received. In essence, the transmitted pulses are maintained synchronized with the received pulses but are not maintained coincident therewith. The use of shaped pulses now becomes practical.

There will be described how a first oscillator generates a pulse train output which is differentiated and the resulting spike used to trigger a first one-shot which drives the transmitter. Also the oscillator output signal is inverted and differentiated to trigger a second similar one-shot, the output of which is used as one of the inputs to a comparator. The pulses in the received signal are now compared against the output of the second one-shot with the results of the comparison being used to adjust the keying of the local oscillator. As a result of this technique, the station will achieve a synchronized phase lock condition with another like station in the network. However, the local receiver is not now required to receive external signals from a remote cooperating station immediately before or after the large transmitter signal which is generated in the local unit. This technique allows the receiver to fully recover its sensitivity before it becomes necessary to receive an external signal. It also makes it possible to more effectively detect the receiver input signals when large transmitter powers are employed.

In the narrow band version of the invention the outputs of one or both one-shots can be filtered in order to produce a shaped envelope transmission. In this latter version of the invention, of course, the received pulses are also shaped so that it now becomes possible to make a point-by-point comparison of received signals in the comparator and thus generate an error signal which is indicative of the information transmitted over the entire duration of a received pulse.

Using this invention the local transmitters can either operate continuously or can be provided with push-to-talk means wherein the local transmitter operates only when the push-to-talk means is actuated.

It is thus an object of this invention to provide a means for mutual communication over a common space channel.

It is another object of this invention to provide a single channel intercommunication system which operates in a relatively narrow bandwidth channel.

It is a further object of this invention to provide a wireless intercommunication system wherein each cooperating unit operates in a single, relatively narrow, bandwidth channel.

It is one more object of this invention to provide a single channel pulse communication system which uses shaped pulses.

These and other objects of the invention will be made apparent as the following description of the preferred embodiment and the drawings proceeds.

DESCRIPTION OF THE PREFERRED EMBODIMENT

Figure 1:
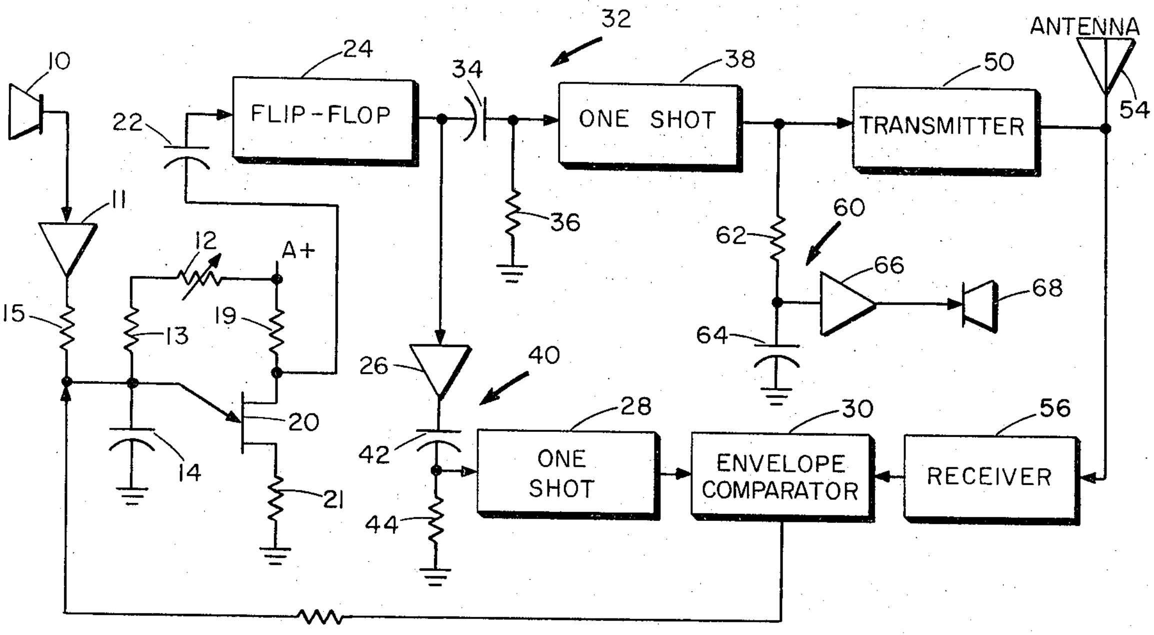
FIG. 1 is a modified block schematic of one embodiment of the invention.

Referring now to the figures wherein like elements are designated by like reference numerals and refer particularly to FIG. 1. In FIG. 1 a relaxation oscillator which includes unijunction 20 operates as a free running pulse generator. Its output comprises a train of pulses position modulated with respect to information received from comparator 30 and microphone 10. Unijunction transistor 20 includes a circuit which is connected in series with resistors 19 and 21 between ground and an A+ voltage bus. The emitter electrode of unijunction transistor 20 is connected to one plate of a capacitor 14 whose other plate is grounded. The capacitor 14 discharge path is through unijunction 20 which, as will be shown below, periodically discharges the capacitor. The basic pulse repetition frequency of unijunction 20 is determined by the value of capacitor 14, together with the value of resistors 13 and 12. It is assumed for the sake of illustration and not for the purposes of limiting the invention that resistor 12 is adjusted so that the basic free running pulse repetition frequency of the pulses generated by unijunction 20 is 24 KHz. This basic pulse repetition frequency is frequency modulated by information received from envelope comparator 30 and also in accordance with local information received from microphone 10 operating through amplifier 11 and resistor 15.

Figure 2:
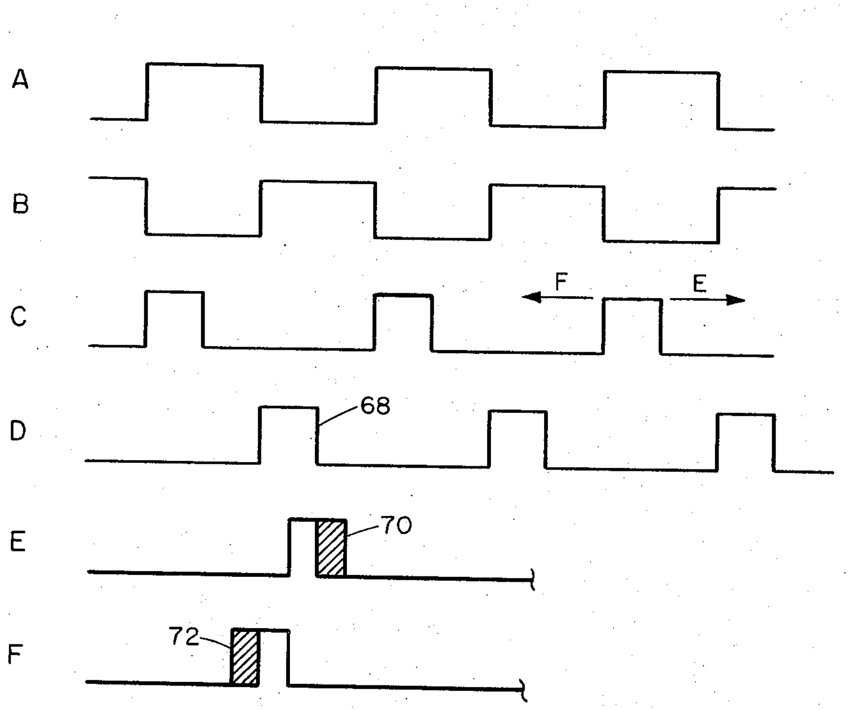
FIG. 2 shows illustrative pulses at various points in the schematic of FIG. 1 and is helpful in explaining the operation of the invention.

The output pulses from unijunction transistor 20 are capacitively coupled through capacitor 22 to a flip-flop 24. Flip-flop 24 divides the input signal in half and produces at its output a square wave having a pulse repetition frequency at 12 KHz in the present illustration. This square wave is differentiated in the circuit 32 comprised of capacitor 34 connected between flip-flop 24 and one-shot 38 and a resistor 36 connected between the input terminal of one-shot 38 and ground. The resulting differentiated pulse triggers one-shot 38 which in this embodiment produces an output pulse having a duration of 20 microseconds. Accordingly, the basic output from one-shot 38 in a pulse tain of 20 microsecond pulses, the pulses being separated by 63 microseconds. The basic pulse train output signal from one-shot 38 is illustrated at FIG. 2, line C. The one-shot 38 output pulses are used to turn on transmitter 50 which thereby radiates into space via antenna 54 a bundle of carrier frequency signals defining a pulse of constant duration, the pulse being time modulated with respect to information received at the oscillator comprised of the unijunction transistor 20 from envelope comparator 30 and microphone 10 as will be further explained below.

The output signal from one-shot 38 is also applied to a circuit 60 wherein the pulses comprising the output signal are integrated by a resistor 22 connected between the output terminal of one-shot 38 and the input terminal of an audio amplifier 66 and a capacitor 64 connected between ground and the input terminal of amplifier 66. The integrated and amplified signal comprises an audio signal which is applied to some utilization means wuch as a speaker 68.

A receiver 56, adapted to the mode of communication of this particular system, is coupled to space by the same or parallel means as the transmitter so that it responds to similar transmitters and other transceivers within the network. In this particular embodiment it has been assumed that rectangular waves, the waves comprising envelopes of RF signals, are being transmitted by the various units; hence, the output from receiver 56 will be a train of detected rectangular waves which are applied to envelope comparator 30.

The output signal from flip-flop 24 is inverted by inverter 26 to produce the waveform illustrated at line B of FIG. 2. This signal is differentiated by circuit 40 which is comprised of a capacitor 42 connected between inverter 26 and one-shot 28 and a resistor 44 connected between ground and input terminal to one-shot 28. One-shot 28, which in this embodiment produces an output pulse of 20 microseconds in length, produces an output pulse train whose pulses occur in the spaces of the pulse train output from one-shot 38. Envelope comparator detects any lack of coincidence of the pulses from receiver 56 with respect to the pulses from one-shot 28. If coincidence occurs the comparator generates no output. If a pulse is received before the one-shot 28 pulse, comparator 30 generates an output which causes an additional positive current which is proportional to the lack of coincidence to be supplied to capacitor 14 so that the subsequent discharge of this capacitor will occur sooner than normal. If, however, a pulse is received after the one-shot 28 pulse comparator 30 generates a signal which withdraws current from capacitor 14, thus delaying the discharge of that capacitor to a time later than normal. In either event, the transmissions from this local station are adjusted so that the transmitted pulses occur halfway between the received pulses. In other words, the transmitted pulses are synchronized with the received pulses but displaced by 180°.

Refer now to FIG. 2 which shows waveforms of the signals at various points in the station of FIG. 1. Line A of FIG. 2 represents the square wave output from flip-flop 24 of FIG. 1. Line B shows the square wave inverted by inverter 26. Lines C and D represent the pulse train output from one-shots 38 and 28, respectively. Line E represents a pulse which is received at the local station so that the portion 70 thereof occurs after the pulse 68 from one-shot 28. Line F illustrates a pulse having a portion 72 which is received before pulse 68. Portion 72 is proportional to a current supplied by comparator 30 to capacitor 14 of FIG. 1 which tends to move the pulse train of line C in the direction of arrow F, while portion 70 is proportional to a current which is drawn from capacitor 14 so as to move the pulse train of line C in the direction of arrow E.

Figure 3:
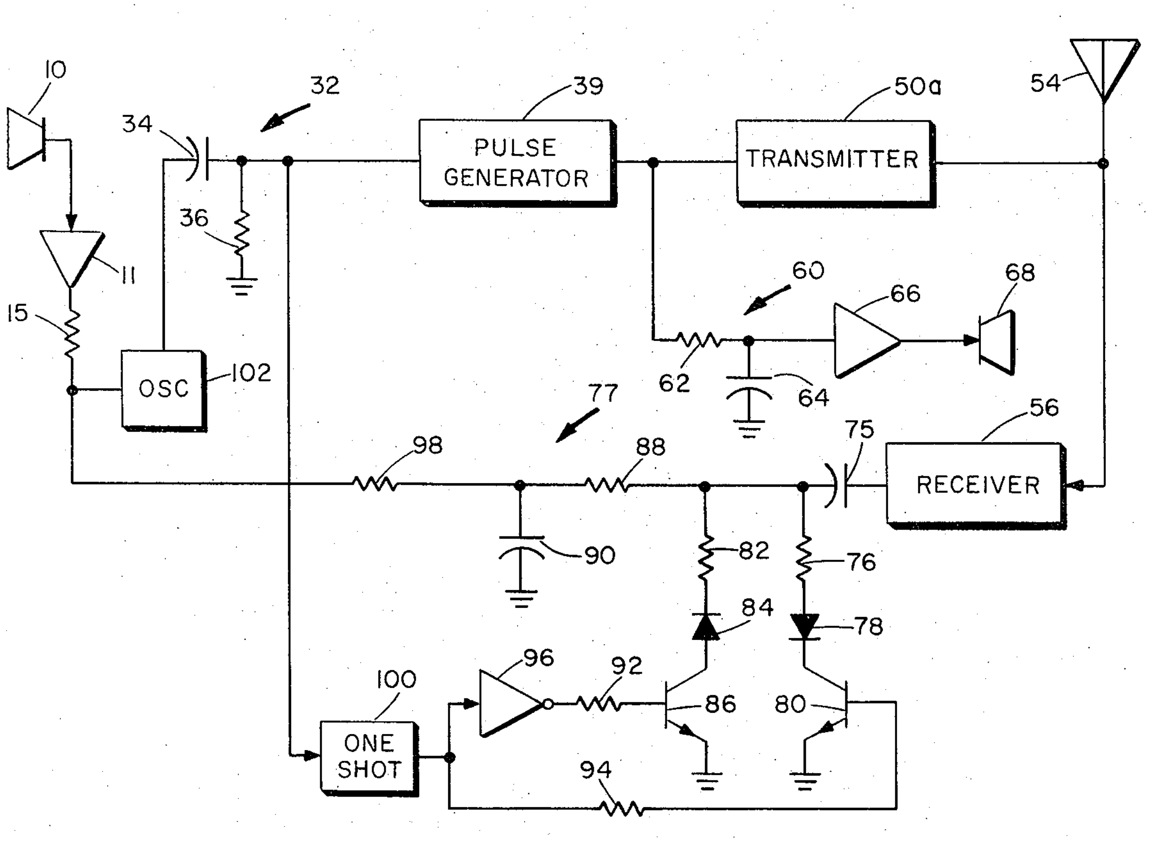
FIG. 3 is a modified block schematic of another embodiment of the invention.

Refer now to FIG. 3 which shows the modified schematic of another version of the invention and further particularly illustrates how shaped pulses can be used with the invention. In this figure, a relaxation oscillator 102 which can be similar to the relaxation oxcillator of FIG. 1 which included a unijunction transistor, operates as a free running pulse generator. Its output, as before, comprises a train of pulses position modulated with respect to information received from a detector circuit 77 via resistor 98 and from microphone 10 via amplifier 11 and resistor 15. In short, as in the embodiment of FIG. 1, oscillator 102 generates a basic pulse repetition frequency which is frequency modulated by information received from a remote station as processed by detector 77 and in accordance with local information received from microphone 10.

The output pulses from the oscillator are differentiated in the circuit 32 comprised of capacitor 34 connected between oscillator 102 and pulse generator 39 and a resistor 36 connected between the input termial of pulse generator 39 and ground. The resulting differentiated pulse triggers pulse generator 39 which in this embodiment produces a pulse shape to conserve the transmission channel bandwidth, suitably having a cosine shaped envelope, which is used to modulate transmitter 50*a* which thereby radiates into space via antenna 54 a bundle of carrier frequency signals defining the aforementioned shaped pulse, the pulse being position modulated with respect too information received at the oscillator 102.

The output signal from pulse generator 39 is also applied to a circuit 60 wherein the pulses comprising the output signal are integrated by a resistor 62 connected between the output terminal of pulse generator 39 and the input terminal of audio amplifier 66 and a capacitor 64 connected between ground and the input terminal of amplifier 66. The integrated and amplified signal comprises an audio signal which is applied to some utilization means such as a speaker 68.

A receiver 56, adapted to the mode of communication of this particular system, is coupled to space by the same or parallel means as the transmitter so that it responds to a similar transmitter or transceiver within the network, for example, a remote transmitter or transceiver coupled to the same channel. In this particular embodiment it is assumed that shaped pulses similar to those already described are being transmitted by the remote unit, hence, the output from receiver 56 will be a train of such shaped pulses which are applied to detector 77. In this embodiment it is assumed that receiver 56 incudes a high cut-off threshold so that it does not respond or generate an output in response to transmissions from the unit's own transmitter.

Detector 77 is comprised of NPN transistors 80 and 86 whose emitter electrodes are connected to ground, the base electrodes of transistor 80 being connected through resistor 94 to the output terminal of a one-shot 100 and the base electrode of transistor 86 being connected through resistor 92 and inverter 96 to the same output terminal of one-shot 100. The collector electrode of transistor 80 is connected through diode 78 and resistor 76 to the common junction between capacitor 75 and resistor 88. The collector electrode of transistor 86 is connected through resistor 82 and diode 84 to the same common connection. The other plate of capacitor 75 is connected to receive output signals from receiver 56 while the other end of resistor 88 is connected to one plate of storage capacitor 90 whose other plate is grounded. The ungrounded plate of capacitor 90 comprises the output terminal of detector 77 and is connected throgh resistor 98 to control oscillator 102 as previously decribed.

Figure 4:
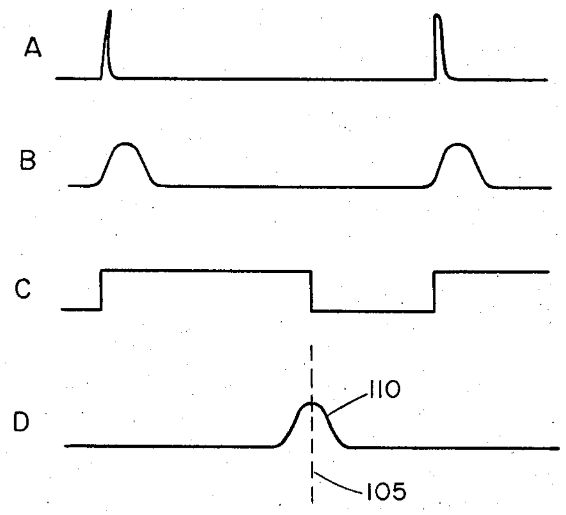
FIG. 4 shows illustrative pulses at various points in the schematic of FIG. 3 and is also useful in explaining the operation of the invention.

One-shot 100 is suitably triggered by the same signal which triggers pulse generator 39. The output pulse from one-shot 100 is predetermined to have a positive going transition when triggered and a negative going transition which is generally midway between consecutive pulses from pulse generator 39 when oscillator 102 is free running. The positive going edge of the output pulse from one-shot 100 provides a timing mark for detector 77 to determine whether the received pulses at this particular station are synchronized with the locally transmitted pulses and displaced 180° therefrom. The operation of the circuit in this regard can best be seen at FIG. 4 reference to which should now also be made. At line A of FIG. 4 the output pulses from differentiator 32 are seen. These pulses trigger pulse generator 39, whose output pulses are seen at line B, and also triggers one-shot 100 whose output pulse is seen at line C. In FIG. 4 it is assumed that oscillator 102 is free running, that is, no information is being received from microphone 10 and detector 77 is generating no output. In this condition a pulse received from a remote station is received so that it is exactly split by a timing mark 105 which is defined by the trailing edge of the output pulse from one-shot 100 illustrated at line C. Returning now to FIG. 3, during the relatively high excursion of the output pulse from one-shot 100, transistor 86 is turned off due to the inverting action of inverter 96 while transistor 80 is turned on. If during the time transistor 80 is turned on a pulse is received by receiver 56 a negative voltage is produced at capacitor 75 and accumulated on capacitor 90. Immediately after the timing mark, that is, at the trailing edge of one-shot 100 output pulse, transistor 80 is turned off and transistor 86 is turned on. Now a positive voltage developed on capacitor 75 which is proportional to the amplitude of the received pulse is accumulated on capacitor 90. If the timing mark occurs precisely at the balance or midpoint of the received shaped pulse, the positive voltage accumulated by capacitor 90 will be exactly equal to the negative voltage therein accumulated so that the total signal from detector 77 delivered to oscillator 102 through resistor 98 will be zero. If the timing mark is not at the balance point of the received shaped pulse, a net positive or negative voltage will be developed for delivery to oscillator 102 depending on whether the balance point occurs after or before the timing mark. The magnitude of the net voltage delivered to the oscillator will be a function of the departure of the timing mark from the center of the shaped pulse and will either cause the oscillator 102 to generate its next output pulse either earlier or later than when in the free running condition and in a direction to move the timing mark towards the balance point of the received shaped pulse.

The invention claimed is:

1. A station adapted for use in a common channel communication system, said system including at least one remote means for transmitting modulated pulses, said station comprising:

means for receiving the pulses from said remote means;

means responsive to the received pulses for generating individual pulses of a pulse train in the interval between received pulses and for modulating the pulse train to include the modulation of the received pulses;

means for transmitting the modulated pulse train; wherein said means for generating and for modulating includes;

a timing network of the relaxation type for generating the individual pulses in said pulse train; and, means for continuously altering the time constant of said network in response to at least the received pulses.

2. A station as claimed in claim 1 wherein said means for generating and for modulating includes means for determining the difference between the time of occurrence at said station of a pulse transmitted from said station and an adjacent pulse received by said station.

3. A single channel communication system including first and second stations, each having a receiver for receiving pulses transmitted from the other station and a transmitter for transmitting a pulse train linking the transmitter to said channel, and wherein intelligence signals local at each station respectively are to be communicated over the system, each station comprising:

an oscillator including an active device and a variable rate charging circuit, the period of said oscillator depending upon the rate of charge of said charging circuit;

means for varying the rate of charge of said charging circuit in accordance with the local intelligence signal of the station;

keying means for said transmitter controlled by the output of said oscillator whereby said transmitter is keyed to transmit a pulse;

means for shaping the transmitted pulses to conserve bandwidth in the channel;

synchronizing means for establishing substantial synchronization between the pulses transmitted and received at each of said stations, said synchronizing means further altering the rate of charge in said charging circuit during the occurrence of a received pulse and wherein said synchronizing means comprises:

means responsive to a pulse transmitted from a local station for generating a timing mark a predetermined time after the pulse is transmitted and generally centrally located between adjacent transmitted pulses; and means for generating a signal related to the departure of a received signal from said timing mark, said signal being applied from said synchronizing means to alter the rate of charge from said charging circuit.

* * * * *